United States Patent [19]

Bright

[11] 4,042,741
[45] Aug. 16, 1977

[54] CHANNEL-SHAPED FLEXIBLE SEALING STRIPS

[75] Inventor: Robert G. Bright, Viersen, Germany

[73] Assignee: Draftex Development AG, Switzerland

[21] Appl. No.: 628,201

[22] Filed: Nov. 3, 1975

[30] Foreign Application Priority Data

Nov. 20, 1974 United Kingdom .............. 50239/74

[51] Int. Cl.² .................... E06B 7/18; E06B 7/22; E04F 19/02; B32B 15/06
[52] U.S. Cl. .................... 428/217; 49/490; 49/491; 49/497; 264/177 R; 428/100; 428/188; 428/358
[58] Field of Search ............. 49/488, 490, 491, 497; 428/99, 100, 188, 358, 217, 218; 264/171, 173, 177 R

[56] References Cited

U.S. PATENT DOCUMENTS

| | | |
|---|---|---|
| 3,167,825 | 2/1965 | Zoller .................... 49/490 |
| 3,333,381 | 8/1967 | Stark et al. .................... 49/490 |
| 3,385,001 | 5/1968 | Bordner .................... 49/497 |
| 3,638,359 | 2/1972 | Kruschwitz .................... 49/490 |
| 3,706,628 | 12/1972 | Azzola .................... 428/358 |
| 3,883,993 | 5/1975 | Pullan .................... 49/490 |
| 3,922,460 | 11/1975 | Jackson .................... 428/217 |
| 3,958,369 | 5/1976 | Mathellier .................... 49/491 X |
| 3,993,819 | 11/1976 | Fewkes .................... 428/358 X |

FOREIGN PATENT DOCUMENTS

| | | |
|---|---|---|
| 1,280,230 | 7/1972 | United Kingdom |
| 1,306,661 | 2/1973 | United Kingdom |
| 1,131,327 | 10/1968 | United Kingdom |
| 1,357,006 | 6/1974 | United Kingdom |
| 649,137 | 1/1951 | United Kingdom .................... 49/491 |
| 705,634 | 3/1954 | United Kingdom .................... 49/491 |

*Primary Examiner*—Harold Ansher
*Attorney, Agent, or Firm*—Leydig, Voit, Osann, Mayer & Holt, Ltd.

[57] ABSTRACT

A channel-shaped sealing strip for mounting on a flange, for example around a door or window opening in a motor vehicle body, comprises a channel-shaped metal core or carrier. On to one wall of the channel, relatively hard flexible material, such as plastics, is directly extruded, while on to the other side wall of the channel relatively softer material, such as rubber, is directly extruded, the relatively hard material extending over the outside surface of the carrier to meet the relatively softer material. The relatively softer material is extruded integrally with an external sealing bead running along the sealing strip. The flexible material may extend over part or all of the inside surface of the carrier member.

17 Claims, 7 Drawing Figures

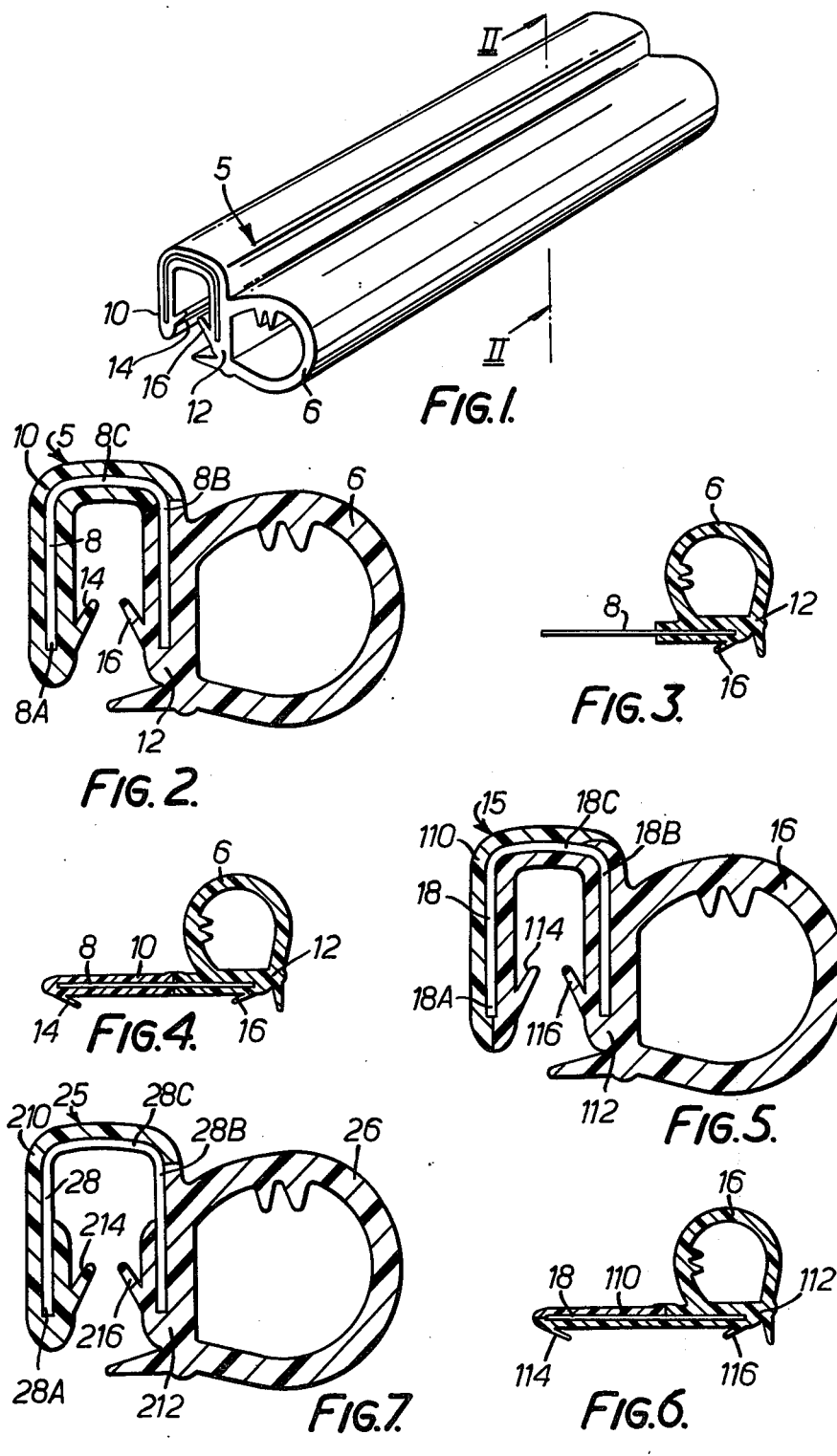

CHANNEL-SHAPED FLEXIBLE SEALING STRIPS

BACKGROUND OF THE INVENTION

The invention relates to flexible channel-section strips for use as draught excluding seals, beadings, flange finishers (for covering welded flanges) and the like, particularly though not exclusively for use in vehicle construction. Such strips are hereinafter referred to generically as "sealing strips" or "channel-shaped sealing strips". More especially, the invention relates to sealing strips to the outside of one of the channel walls of which is attached a length of beading of soft material, such as rubber material in tubular form.

Channel-shaped sealing strips are known in which a channel-shaped metal core or carrier is provided with a complete coating of a relatively hard flexible material such as plastics. Such a sealing strip may be fitted over a flange around a door or window opening, such as in a motor vehicle body, and protects and hides the flange. In many applications, however, it is desired that the sealing strip shall also provide a draught and weather-proofing function, and it is known to secure a beading of relatively softer material to the outside of one side wall of the sealing strip. The sealing strip is mounted onto the flange so that the door closes onto this soft beading to provide the desired draught and weatherproofing. However, such a construction is wasteful of expensive material since one side of the channel is, of necessity, covered by a layer of plastics material and also by a layer of the softer material forming the beading. Additionally, there is the problem of securing the softer sealing section to the relatively hard material. Such securing may be carried out by means of stitching or adhesive or some form of mechanical interlock. In any of these cases, however, it is expensive of time and/or material, and/or introduces production difficulties.

It is an object of the invention to provide an improved channel-shaped sealing strip.

It is a more specific object of the invention to provide a channel-shaped sealing strip with an improved mounting for the sealing beading, and an improved method for making such a sealing strip.

Channel-shaped sealing strips may be provided with gripping ribs running along the inside, facing, walls of the channel and projecting towards each other for assisting in maintaining the strip on a mounting flange. It is another object of the invention to provide a channel-shaped sealing strip with improved and more efficient gripping ribs.

BRIEF SUMMARY OF THE INVENTION

According to the invention, there is provided a channel-shaped sealing strip, comprising a channel-shaped carrier member made of relatively rigid material but designed so as to be flexible about the length of the channel, a covering of flexible material over at least the outside surface of the carrier member, at least part of the said material on one side wall of the carrier member being of relatively hard flexible material which is placed directly onto the carrier member, at least part of the flexible material on the other side wall of the carrier member being of relatively softer flexible material which is placed directly onto the carrier member, and a beading running along the outside of the channel and defined by the relatively softer flexible material.

According to the invention, there is also provided a method of making a channel-shaped sealing strip, comprising the step of extruding relatively hard and relatively soft flexible covering materials onto different regions of a longitudinally extending carrier member so as together to completely cover at least one surface thereof and to join along a line extending longitudinally of that surface, the relatively softer material additionally being extruded to provide a beading extending longitudinally of the carrier member parallel to the said line, the said regions being such that, with the carrier member shaped into channel form, one side wall of the channel so formed is covered by the relatively softer material and the beading runs along the outside of this wall, and the other side wall of the channel is covered by the relatively hard material.

According to the invention, there is further provided a channel-shaped sealing strip, comprising a channel-shaped metal carrier member, and flexible material in channel shape and extruded directly onto the outside surface and at least part of the inside surface of the carrier, the flexible material being extruded to define gripping ribs which extend respectively along the two inside facing walls of the channel and project towards each other for assisting in retaining the sealing strip on a mounting flange, the ribs on the respective side walls of the channel being of different hardnesses.

BRIEF DESCRIPTION OF THE DRAWINGS

Sealing strips embodying the invention and methods according to the invention of making sealing strips, will now be described, by way of example only, with reference to the accompanying diagrammatic drawings in which:

FIG. 1 is a perspective view of one of the sealing strips;

FIG. 2 is an enlarged cross-section on the line II—II of FIG. 1;

FIGS. 3 and 4 illustrate stages in the manufacture of the sealing strip;

FIGS. 5 and 6 are views respectively corresponding to FIGS. 2 and 4 but showing a modified construction and method; and FIG. 7 is a view corresponding to FIGS. 2 and 5 but showing another modified construction.

DESCRIPTION OF PREFERRED EMBODIMENTS

Referring now more specifically to the drawings, FIG. 1 shows a sealing strip comprising a part 5 of channel-shaped form for gripping a flange around a door opening in a vehicle body, and a part 6 comprising a hollow tubular beading for sealing against a door which closes over the vehicle body opening.

FIG. 2 shows the construction of the sealing strip in more detail.

Part 6 includes a carrier member 8 which is made of relatively rigid material such as metal but its design is such that it is reasonably flexible about the length of the channel. For example, it may comprise a series of U-shaped strips which are spaced a short distance apart and are either entirely separate from each other or are joined only by thin flexible connecting links. Instead, however, the carrier member could be made of wire or corrugated metal with the corrugations running around the channel. It will be appreciated, however, that these are not the only forms which the carrier member 8 could take.

As shown in FIG. 2, one wall 8A of the carrier member is covered with relatively hard flexible covering material 10, this material being placed directly on the carrier member. The other wall 8B of the carrier member carries relatively softer flexible covering material 12, this again being placed directly on the carrier member. In addition, the material 12 is shaped to define the hollow tubular beading 6. The relatively hard and relatively soft flexible covering materials 10 and 12 are arranged to extend around and on to the base 8C of the carrier member where they make contact with each other, so that together they entirely cover the carrier member 8.

The material 10 may be arranged to overlap the material 12 in the region where they contact each other.

The material 10 and the material 12 are each arranged to define respective longitudinally extending ribs 14, 16, which grip the flange when the part 5 is placed thereover and help to prevent its inadvertent removal. It will be apparent that one of the ribs is thus made of relatively hard material while the other is made of relatively softer material. The softer material provides a good seal and grip, while the hard material provides good location on the mounting flange.

The relatively hard flexible covering material 10 is preferably plastics material and the relatively softer flexible covering material 12 is preferably rubber material. The plastics material may for example be polyvinylchloride (PVC).

The relatively hard covering material 10 provides a firm covering for the wall of the sealing strip which is remote from the door of the vehicle opening and, if made of plastics material, can be given a suitable decorative covering which additionally can hide any tendency of the shape of the individual elements of the carrier member 8 to become noticeable through the covering material, particularly in those regions where the sealing strip has to be bent through a relatively small radius. The relatively softer material 12 is required in order to provide a good seal for the door.

The covering materials 10 and 12 may advantageously be placed on to the carrier member 8 by extrusion steps as will now be described, by way of example, with reference to FIGS. 3 and 4.

As shown in FIG. 3, the carrier member 8 is initially in the flat form. The relatively softer flexible covering material 12 is then extruded over one longitudinally extending edge region of the blank, the extrusion die being such as to form the hollow tubular beading 6. The rubber material 12 is then cured.

The blank 8 with the cured rubber material 12 thereon is then subjected to a second extrusion step by which the relatively hard plastics covering material 10 is extruded over the remainder of the blank so as to make contact with and overlap the edge of the material 12, as shown in FIG. 4. Thereafter, the covered blank is bent into the required channel-shape as shown in FIG. 2. It will be apparent that the join between the plastics material 10 and the rubber material 12 is positioned such as to minimise the amount of stretching which the rubber material undergoes when the flat carrier is bent into the U-form.

Although FIGS. 2 to 4 show the relatively hard and relatively softer covering materials as respectively covering such regions of the carrier member 8 as to join along a line extending along the base of the channel, modifications are possible whereby the join is positioned elsewhere with respect to the carrier member, that is, one of the two flexible covering materials 10, 12 could cover a greater extent of the carrier member than is shown in the Figures, the other flexible covering material covering a proportionately smaller extent thereof.

For example, in the modification shown in FIGS. 5 and 6, items corresponding to similar items in FIGS. 1 to 4 are similarly referenced except for the addition of an extra digit "1" each reference. It will be apparent that the relatively hard material 110 covers a smaller proportion of the carrier 18A than does the material 10 in the embodiment of FIGS. 1 to 4, while the relatively soft material 112 covers a correspondingly larger proportion of the carrier. This arrangement ensures that both gripping legs 114 and 116 are made of the relatively soft material which may help to improve the strength of gripping. There is also a saving in the quantity of plastics material used.

The carrier member is preferably provided with gaps or apertures through it so that the extruded materials 10, 12, 110, 112 extend through these gaps or apertures during the extrusion process and thereby become firmly keyed to the carrier member. In this way, there is less likelihood of a gap or separation occurring between the two covering materials, and/or between one or both of the covering materials and the carrier member, when the carrier member is bent into the channel form. The bonding agent referred to below may also be useful in this respect.

In FIG. 7, items corresponding to items in FIGS. 1 and 2 are similarly referenced except for the addition of an extra digit "2" before each reference.

FIG. 7 shows a modification to the strip of FIGS. 1 and 2 in which the relatively hard flexible covering material 210 extends around the distal edge of the wall 28A of the carrier member but extends only partially upwards over the inside surface thereof. Similarly, the relatively softer flexible covering material 212 extends around the distal edge of the wall 28B of the carrier member and extends only partially upwards over the inside surface thereof. A portion of the inside of the carrier member is therefore left uncovered. There is thus a useful saving in covering material. It is advisable to protect the exposed surface of the carrier member with a corrosion inhibiting agent. Any suitable agent may be used. A suitable agent is PROTEFAN 640P (Trade Mark) sold by Goldschmidt A. G. of Mannheim-Rheinau, Germany; this agent is in fact also a bonding agent and assists in bonding the plastics material to the carrier member 28, and it may advantageously be used for its bonding properties in the other forms of sealing strip illustrated.

Reference to FIGS. 4 and 6 will show how the extrusion process may be modified to produce the sealing strip shown in FIG. 7.

Although the Figures illustrate only two ribs (e.g. 14 and 16), it will be appreciated that there may be more than two such ribs with, for example, one rib on one leg of the U and two or three ribs on the opposite leg of the U.

The sealing strips described and illustrated are advantageous in that they require less covering material than does a sealing strip in which the carrier member is entirely covered with relatively hard flexible covering material, with the sealing beading, which necessarily has to be made of relatively softer material, thereafter secured in position as by adhesive. Furthermore, the method of manufacturing is simpler and more efficient.

Although the Figures show the sealing beading as running along the side of the sealing strip, it will be apparent that it may be positioned to run along the base of the channel, possibly by slightly extending the area of the softer material (e.g. 12) on the outside of the strip. Instead of being tubular, the beading can have any other suitable form.

What is claimed is:
1. A channel-shaped sealing strip, comprising
a channel-shaped carrier member made of relatively rigid material but designed so as to be flexible about the length of the channel,
a covering of flexible material over the outside surface of the carrier member and extending over the distal edges of the side walls of the carrier member and over at least part of the inside surfaces thereof,
the said flexible material defining gripping ribs extending longitudinally along the inside surface of the channel and projecting toward each other from the opposite side walls thereof,
at least part of the said material on one side wall of the carrier member being of relatively hard flexible material which is placed directly onto the carrier member,
at least part of the flexible material on the other side wall of the carrier member being of relatively softer flexible material which is placed directly onto the carrier member,
the relatively hard and relatively softer materials not overlapping each other, and
a beading running along the outside of the channel and defined by the relatively softer flexible material.

2. A strip according to claim 1, in which the relatively hard and the relatively softer flexible materials are each extruded onto the carrier member.

3. A strip according to claim 1, in which a portion of the inside surface of the carrier member is not covered by the flexible material and is protected against corrosion by a corrosion inhibitor.

4. A strip according to claim 1, in which
the or each gripping rib on one side of the strip is defined by the relatively hard flexible material and the or each gripping rib on the other side of the channel is defined by the relatively softer flexible material.

5. A strip according to claim 1, in which
the said relatively hard flexible material completely covers the distal edge and both surfaces of the said one side wall of the carrier member, and
the said relatively softer flexible material covers the distal edge of the said other side wall of the carrier member and extends over both surfaces thereof from that edge,
the remainder of the carrier member being covered by the relatively hard flexible material.

6. A strip according to claim 5, in which
the or each gripping rib on one side of the strip is defined by the relatively hard flexible material and the or each gripping rib on the other side of the channel is defined by the relatively softer flexible material.

7. A strip according to claim 1, in which
the relatively hard flexible material covers the major portion of the outside surface of the carrier member, and
the relatively softer material covers the inside surface of the carrier member and the remaining portion of the outside surface thereof.

8. A strip according to claim 7, in which the gripping ribs on both sides of the strip are defined by the relatively softer flexible material.

9. A strip according to claim 1, in which the relatively hard and relatively softer flexible materials are plastics material and rubber material, respectively.

10. A method of making a channel-shaped sealing strip, comprising the steps of
extruding flexible covering material in relatively hard and relatively soft forms directly onto different regions of a longitudinally extending carrier member so as together they completely cover one surface thereof and join along a line extending longitudinally of that surface, the lateral edges of the carrier member and at least the marginal regions of the other surface of the carrier member being also directly covered by the extruded flexible covering material, at least part of this material being in the relatively soft form,
the material in the relatively soft form on the said one surface additionally being extruded to provide a beading extending longitudinally of the carrier member parallel to the said line,
the material on the said other surface additionally being extruded to provide ribs extending longitudinally of the carrier member parallel to the said line,
the said regions being such that, with the carrier member shaped into channel form, the outside surface of one side wall of the channel so formed is covered by the material in the relatively soft form, the beading runs along this outside surface, the outside surface of the other side wall of the channel is covered by the material in the relatively hard form, and the gripping ribs run along the inside surfaces of the side walls of the channel.

11. A method according to claim 10, including the step of extruding the material in its relatively hard and relatively soft forms so that they respectively extend around the lateral edges of the carrier member and extend for short distances, only, along the other surface thereof so that, with the carrier member shaped into channel form, the major portion of its inside surface is not covered by the covering material.

12. A method according to claim 10, including the step of extruding the material in its relatively hard and relatively fast forms so that together they cover the whole of the other surface of the carrier member and join along a line which extends longitudinally of the carrier member along that surface and is parallel to and in alignment with the first-mentioned line.

13. A method according to claim 10 including the step of extruding the relatively soft form of the flexible material so that, by itself, it completely covers the other surface of the carrier member.

14. A method according to claim 10, including the step of extruding the relatively hard and relatively soft forms of the flexible material sequentially.

15. A method according to claim 10, in which the extrusion of the relatively hard and relatively soft forms of the flexible material is carried out when the carrier member is flat, and including the subsequent step of shaping the flat carrier member into channel form.

16. A channel-shaped sealing strip, comprising
a channel-shaped metal carrier member, and
flexible material in channel shape and extruded directly onto the outside surface of, and at least part of the inside surface of, the carrier,
the flexible material on the inside surface of the carrier being extruded to define gripping ribs which are integral with the flexible material on the inside surface of the carrier and which extend respectively along the two inside facing walls of the channel and project towards each other for assisting in retaining the sealing strip on a mounting flange, the said ribs on the respective walls of the channel being of different hardnesses.

17. A strip according to claim 16, including a beading extending longitudinally of the strip and extruded integrally with the flexible material on the outside of one wall of the carrier member.

* * * * *